United States Patent [19]
Peterson et al.

[11] 3,764,899
[45] Oct. 9, 1973

[54] APPARATUS FOR MEASURING VARIATIONS IN THICKNESS OF ELONGATED SAMPLES OF THIN PLASTIC FILM

[75] Inventors: Paul H. Peterson, Bloomington; Duwayne M. Thon, Edina, both of Minn.

[73] Assignee: Winzen Research, Inc., Minneapolis, Minn.

[22] Filed: Feb. 14, 1972

[21] Appl. No.: 226,226

Related U.S. Application Data

[63] Continuation of Ser. No. 883,415, Dec. 9, 1969, abandoned.

[52] U.S. Cl............................................. 324/61 R
[51] Int. Cl........................................... G01r 27/26
[58] Field of Search............... 324/61 R, 61 P, 65 R

[56] References Cited
UNITED STATES PATENTS
2,399,582  4/1946  Stevens............................. 324/61 P
2,562,575  7/1951  Raesler.............................. 324/61 R Primary Examiner—Alfred E. Smith
Attorney—Warren A. Sturm

[57] ABSTRACT

Capacitive type thickness measurement apparatus capable of measuring minute variations in the thickness of thin plastic films. A plastic film is passed through a suitably characterized electrode assembly which is of generally small surface area. The electrode is connected to control the changes in frequency of an oscillator. The output of the oscillator is suitably converted to provide a train of standardized, or constant energy pulses, from which an energy content determination is made to provide a recordable indication of the thickness of the plastic material.

5 Claims, 4 Drawing Figures

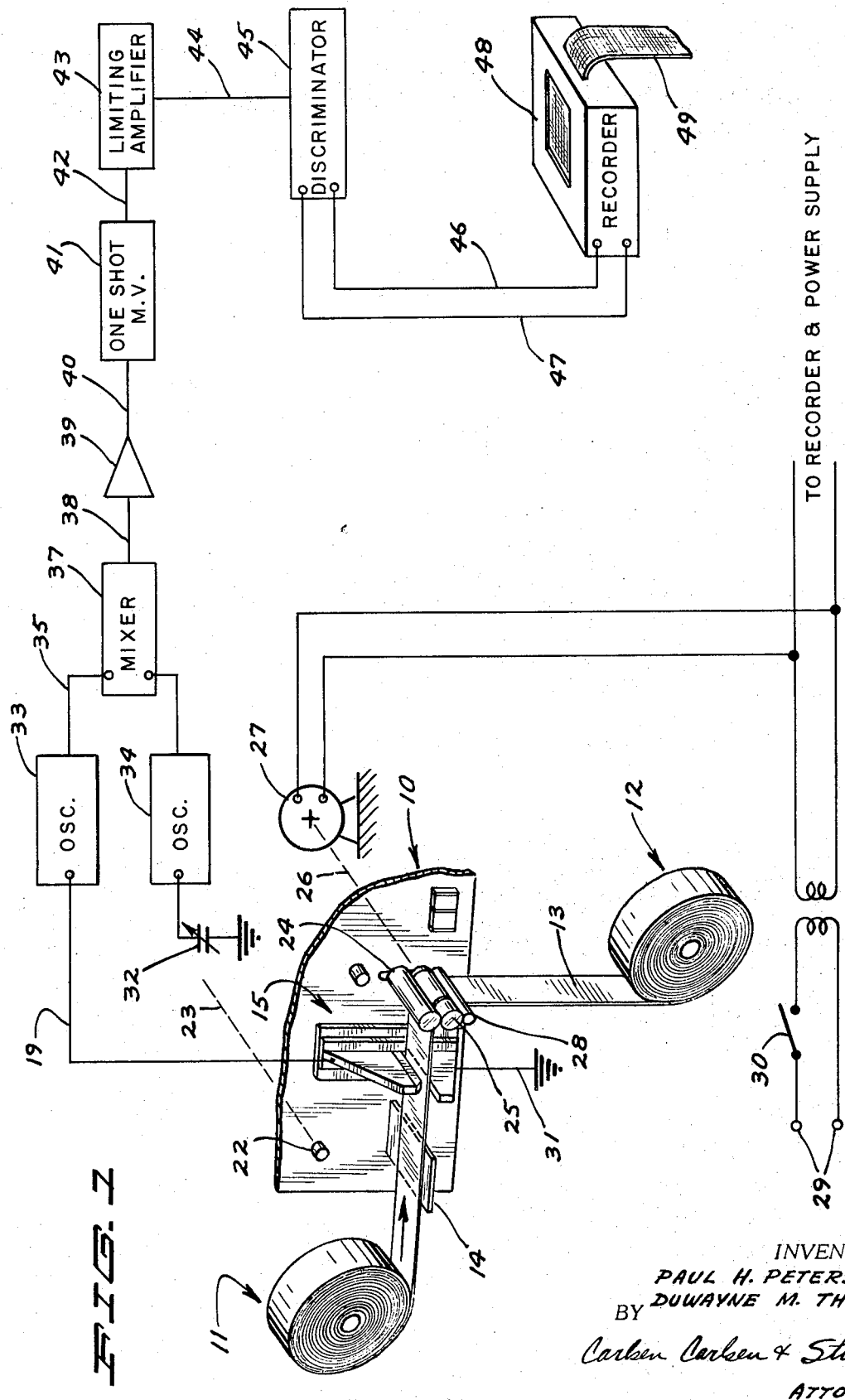

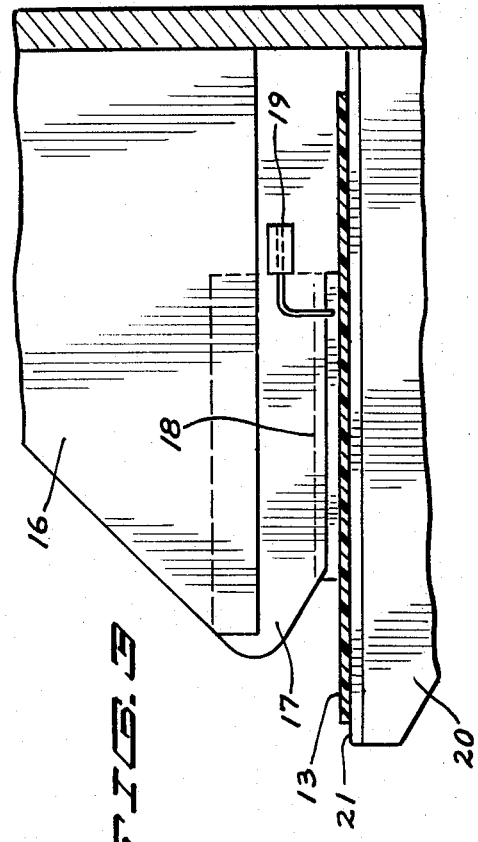
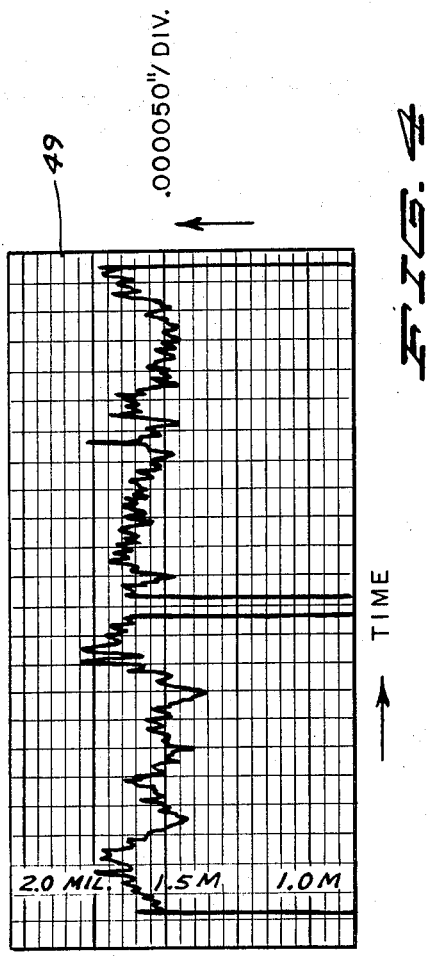
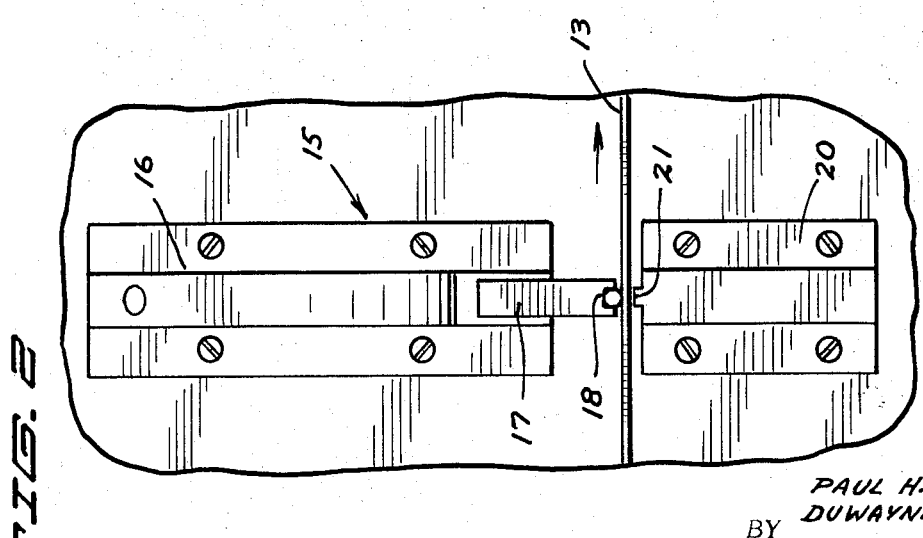

APPARATUS FOR MEASURING VARIATIONS IN THICKNESS OF ELONGATED SAMPLES OF THIN PLASTIC FILM

This is a continuation of application Ser. No. 883,415, filed Dec. 9, 1969, now abandoned.

This invention relates generally to capacitance measuring systems and is more particularly directed to systems and apparatus for capacitively determining the thickness of a film of dielectric material, such as plastic film.

In the field with which our invention is concerned, there has long existed, a desirability for a rapid and accurate determination of deviant variations in film thickness of films of plastic material. The present system and apparatus has been developed to fulfill a need to determine variations in thickness of plastic film in the magnitude of 5 millionths of an inch. As will be described in greater detail below, this has been accomplished through the use of apparatus incorporating previously generally known capacitance measuring principles in combination with an electrode assembly through which plastic material or film may be drawn, under substantially no tension, whereby an output signal may be provided that may easily be utilized to indicate thickness variations from a predetermined standard, down to a magnitude of 5 millionths of an inch.

It is therefore an object of our invention to provide new and improved film thickness measuring apparatus.

Another object of our invention is to provide improved capacitance measuring apparatus for measuring deviations in serial thickness of a dielectric film material.

A still further object of our invention is to provide a transport for serially examining plastic film material which eliminates errors that may result from variations in film thickness due to tension on the dielectric film.

A still further object of our invention is to provide an improved characterized electrode assembly for use in determining variations in thickness of dielectric film material.

It is a still further object of our invention to provide dielectric film thickness measuring apparatus in which the frequency of an oscillator is controlled in accordance with variations in capacitance of an electrode assembly which includes a serially moving portion or film of dielectric material and in which the output signal of said oscillator is characterized and standardized to provide an indication of the variation in thickness of the dielectric film to an output utilization device.

These and other objects of our invention will become apparent from a consideration of the appended specification, claims and drawings, in which FIG. 1 is a functional schematic diagram of apparatus embodying the principles of our invention;

FIG. 2 is an enlarged front elevational view of an electrode assembly shown as a fragmentary portion of FIG. 1;

FIG. 3 is a partially sectional, side elevational, fragmentary view of the electrode assembly shown in FIG. 2 of the drawings; and FIG. 4 is a representative sample of a recording made of the output of the apparatus of the embodiment of FIG. 1 of the drawings showing the serial thickness variations in two separate samples of 1.5 mil dielectric film.

Referring now to the drawings, the pictorial diagrammatic representation in FIG. 1 includes a panel 10 upon which various elements of the system may conveniently be mounted although, only substantially the mechanical portions are shown in pictorial illustration. Panel 10 forms a support for the forwardly extending film support plate 14, electrode assembly 15, adjustable idle roller 24, drive roller 25 and a guide bar 28.

Further appropriate switch means and actuating mechanisms are illustrated but have not been identified by reference characters as their function may be easily understood by one skilled in the art or may not be required for a complete understanding of the principles of our invention.

An elongated strip, or web of plastic material is indicated generally by reference character 13 and is shown partially disposed upon a supply reel, indicated generally by reference character 11, and as passing over the top of support plate 14, through electrode assembly 15, intermediate rollers 24 and 25 and intermediate guide bar 28 and drive roller 25 down to a take-up reel indicated generally by reference character 12. While not shown on the drawings it is anticipated that it may be desirable under certain circumstances to provide supply and take-up reel apparatus in place of the simple elements, indicated by reference characters 11 and 12 on the drawing, which possess the characteristics of supplying and withdrawing material from a given area without asserting any substantial force either of retardation or tension on the material while it passes through the inspection area.

As is shown in enlarged FIGS. 2 and 3 of the drawings, electrode assembly 15 is comprised of a top portion 16 which is adapted to receive and hold an insulated insert which, in turn, is provided with a groove at its lower portion that is adapted to receive and hold a longitudinally elongated electrode 18 of substantially circular cross section. A suitable conductor 19 is shown connected at one end of electrode 18. Another electrode, which may be vertically adjustable upon panel 10, is comprised of current conducting material and is indicated generally by reference character 20. The other electrode, 20, is provided with a longitudinally elongated raised portion 21 at its center that is adapted to be vertically adjustably disposed in parallel with and substantially underneath electrode 18 so as to define, therebetween, a generally uniform gap for slidably receiving the elongated film of dielectric or plastic material, the thickness and variations thereof of which is to be determined.

Referring again to FIG. 1, a pair of terminals 29 are shown adapted for connection to a suitable source of alternating current (not shown) to energize a transformer through single pole single throw switch means 30. The secondary, or output of the transformer is shown adapted to be connected to a recorder and a power supply, both of such connections being readily ascertainable by those skilled in the art. The source of energy is also shown connected to a pair of input terminals on a drive motor 27 that is connected to drive roller 2t through suitable driving means 26 to rotate the same in substantial correspondence with or synchronism with a suitable recording device (48) so as to enable correlation between recorded indicia representative of variations of thickness of plastic material that is pulled through the measuring apparatus by drive roller 25.

On FIG. 1, one of the electrodes on electrode assembly 15 is shown connected to ground through conductor 31 and the other of the electrodes is shown having conductor 19 connected to the frequency determining input terminal of an oscillator 33. A second oscillator 34 is shown having a frequency determining adjustable variable capacitance device 32 connected to a frequency determining input terminal thereon, and to an adjustment knob 22 on panel 10 through suitable driving means 23. The frequency of oscillator 34 is determined by the adjusted value of the capacitance connected to its input terminal while the frequency of oscillator 33 is determined by the value of the capacitance of electrode assembly 15 which, in turn, is determined by the thickness of dielectric material that may exist intermediate the electrodes 18 and 21 thereof.

Oscillators 33 and 34 are connected to a suitable mixer 37 through conductors 35 and 36. Mixer 37 may be any common form of means for combining alternating current signals and it is well known that such a mixer may have an output consisting of the sum or difference of the signals and one of these resultant signals may be selected by suitable filter means for further use in the system.

In the present apparatus, it is contemplated that the low frequency difference signal between the two signals will be selected and applied to amplifier 39 through a conductor 38. The substantially low frequency signal which is supplied at the output of amplifier 39 is in turn connected to a one-shot multivibrator 41 through conductor 40 to provide an output train of pulses of substantially equal energy content proportional to the frequency of the alternating current signal supplied to the input of one-shot multivibrator 41.

The signal is further characterized and standardized by applying it to the input of a limiting amplifier 43 through conductor 42. The output of limiting amplifier 43 is connected to a discriminator 45 through a conductor 44 and the output of discriminator 45, consisting of a direct current potential of varying amplitude proportional to the frequency of the pulses applied to the input of discriminator 45 may then be applied to a suitable recorder, 48, through conductors 46 and 47.

Recorder 48 may be of the recording oscillograph type or any other suitable apparatus that may accept an intelligible signal to provide an indicia of such signal on a recording medium, in the example shown, a strip chart that is suitably calibrated and suitably displaced with respect to the recording device so that a continuous indicia of the signal applied to the recorder is presented in such a manner that it may be correlated to the material that is passed through electrode assembly 15.

An example of such a recording is indicated on FIG. 4 in the form of a portion of a strip chart (indicated by reference character 49) which has a longitudinal scale that is proportional to time, or displacement, and a lateral scale that is proportional to units of thickness or deviations from a predetermined standard of thickness. In the curves shown, a nominal 1.5 mil sample of plastic film may be seen to have had a thickness variation in the magnitude of 0.00045 inches from such nominal thickness.

While the majority of the components utilized in the system disclosed as an illustrative embodiment of our invention may easily be determined by those skilled in the art, it should be appreciated that electrode assembly 15 provides an effective area of approximately 0.032 × 2" as the area of the gap through which the dielectric film is passed for the determination of its thickness and changes in thickness. The area of the gap is determined by the surface of the top part of portion 21 on electrode 20 and the lower portion of electrode 18, which is substantially a single line based upon the cylindrical shape of electrode 18. It may be discernible by those skilled in the art that the effective area of the gap might be accomplished through the use of other geometrical configurations which have not been illustrated or discussed in connection with the instant disclosure.

OPERATION

When it is desired to inspect the characteristics of a dielectric film, a sample may be derived by severing the same from a roll of plastic film material, perhaps as the material is being extruded from a die and is being deposited upon a suitable take-up reel. The sample may be disposed upon supply reel 11 and threaded through the apparatus, as shown on FIG. 1 of the drawings, to take-up reel 12. The apparatus may be energized by closing switch 30 which will initiate operation of drive motor 27, recorder 48 and the intermediate elements. Oscillators 33 and 34 may preferably be suitably adjusted to be nominally operative at the same frequency and mixer 37 may be constructed to provide an output proportional to the difference in frequencies between oscillators 33 and 34 (preferably a zero frequency difference). This could provide, under normal circumstances, an output to the recording mechanism in recorder 48 which would center the recording mechanism at a recording styli position proportional to the nominal thickness of the film, 13.

As the dielectric or plastic film 13 is pulled through the gap in electrode assembly 15 recorder 48 is operative to drive its recording medium, 49, at a speed proportional thereto and is also operative to continuously record an indicia proportional to the signal that is proportional to the thickness of the plastic film thereon to provide a substantially complete correlation and record of the varying thickness of the dielectric or plastic film 13 with respect to its length as it progresses from one of its ends to another.

Having now therefore fully illustrated and described our invention, what we claim to be new and desire to protect by Letters Patent is:

1. The method of determining variations in lateral and longitudinal thickness of a plastic film sample, comprising the steps of;
   a. selecting a longitudinally elongated sample of plastic film material, the variations in thickness of which are to be recorded;
   b. providing a pair of adjustable electrodes having a very large length to width ratio and a width of less than 0.032 inches;
   c. adjustably mounting one end of each of said electrodes on a common base therefor;
   d. adjusting the gap between the electrodes to substantially the thickness of said sample;
   e. connecting the electrodes to a nominally high frequency oscillator means so as to affect the frequency thereof in accordance with variations in dielectric constant therebetween;
   f. providing a second adjustable oscillator means;
   g. adjusting the frequency of the second oscillator means to the same frequency as that of the first oscillator means, including said pair of electrodes;

h. moving said strip longitudinally through the gap between said electrodes without any tension thereon; and i. serially recording any differences in frequency between said first and second oscillator means.

2. Apparatus for measuring minute variations in the thickness of a sample of thin plastic film comprising in combination;

a. a substantially vertical base member;

b. a first horizontally extending electrode member stationarily disposed on said base member;

c. a second horizontally extending electrode member adjustably vertically disposed on said base member parallel to and adjacent to said first electrode to define a variable generally horizontally disposed gap, having a very large length to width ratio and a width of less than 0.032 inches therebetween;

d. a first source of high frequency oscillatory signal, including a frequency determining means having a pair of input terminals therefor;

e. a second source of high frequency oscillatory signal of predetermined constant frequency;

f. means connecting one of said input terminals on the first source of signal to said first electrode and the other of said input terminals to said second electrode; and g. means for determining the variation in the difference in frequency of said first and second sources of signal.

3. The apparatus of claim 2 in which one of the electrodes has a circular cross section.

4. The apparatus of claim 2 in which the first and second electrodes are configured to substantially define a capacitance element including an elongated linear member and an elongated planar member.

5. The apparatus of claim 2 in which one of the electrodes is configured to define a longitudinally extending line.

* * * * *